Sept. 6, 1927.
H. E. VAN DERHOEF
1,641,403
PROCESS AND APPARATUS FOR UNITING STRIPS OF MATERIAL
Filed Nov. 9, 1923
4 Sheets-Sheet 1
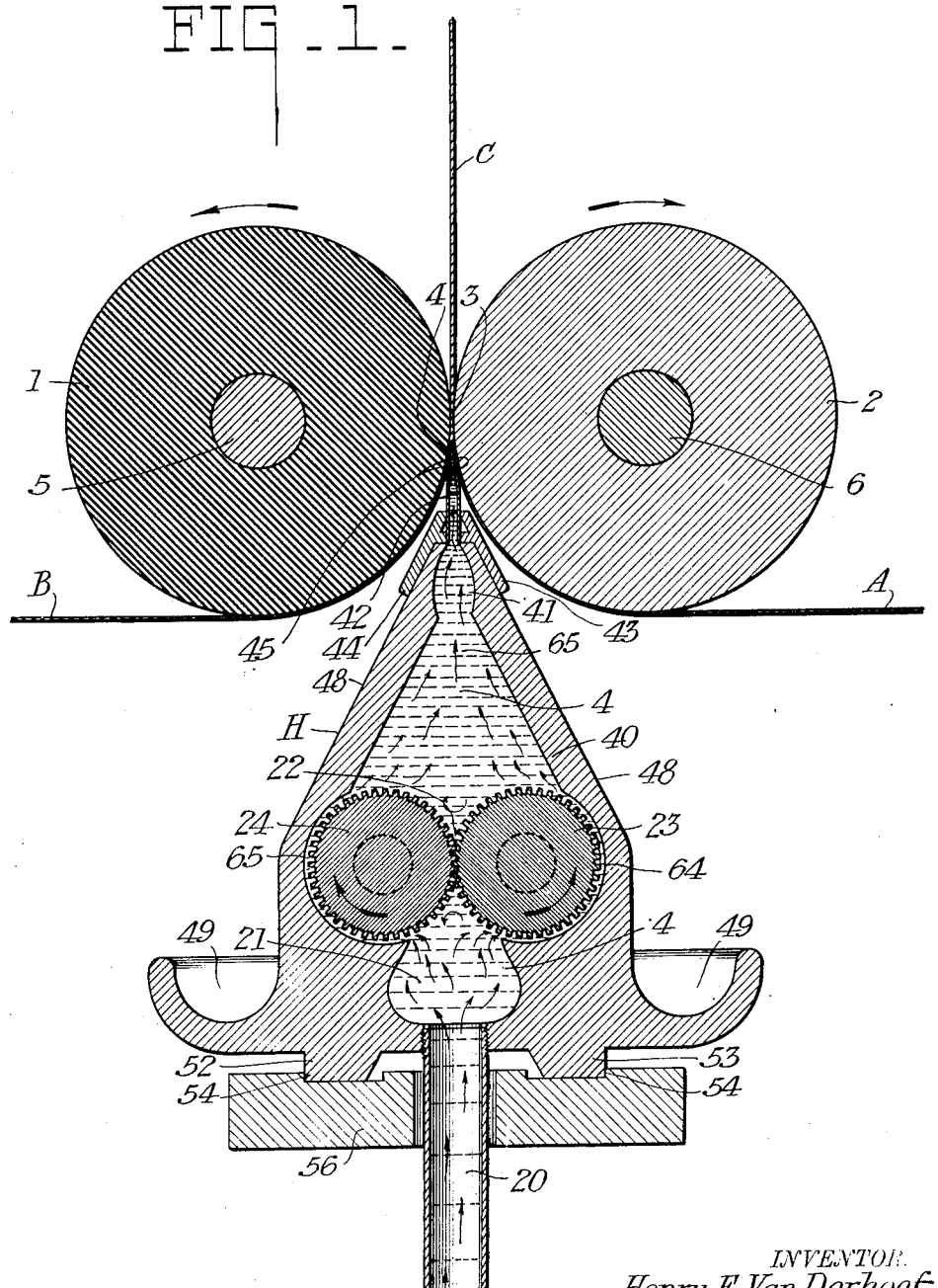
FIG-1-
INVENTOR.
Henry E. Van Derhoef,
BY
ATTORNEY Sept. 6, 1927.  1,641,403
H. E. VAN DERHOEF
PROCESS AND APPARATUS FOR UNITING STRIPS OF MATERIAL
Filed Nov. 9, 1923    4 Sheets-Sheet 2
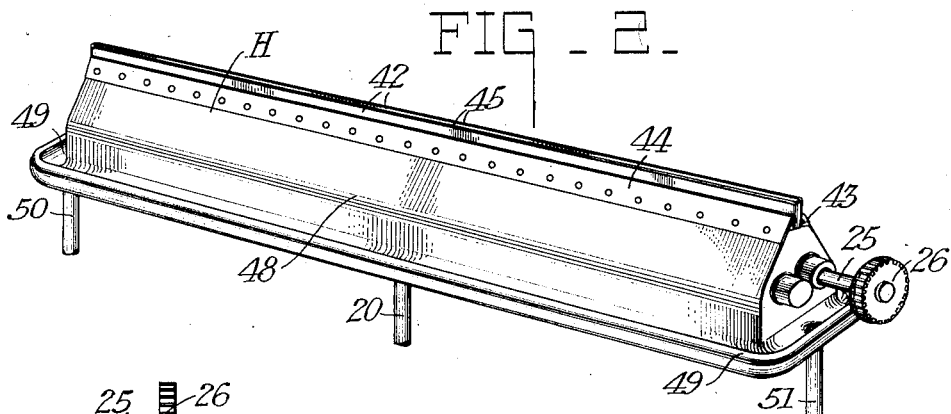
FIG_2_
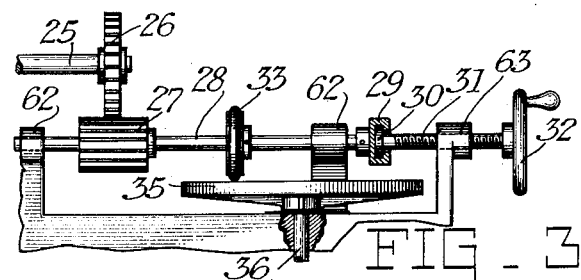
FIG_3_
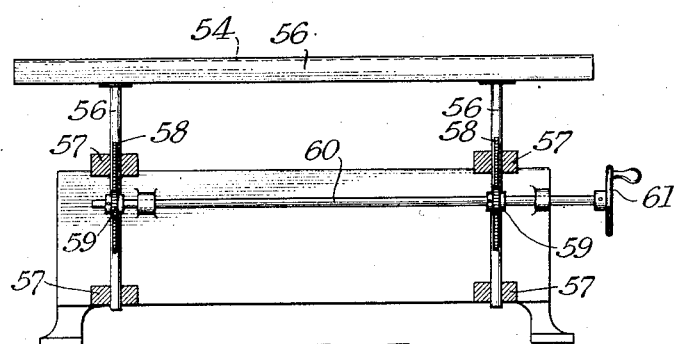
FIG_4_
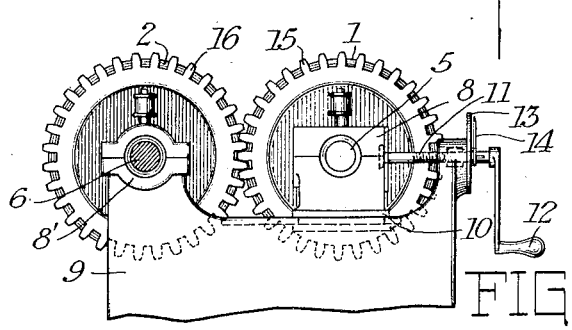
FIG_5_
INVENTOR.
Henry E. Van Derhoef,
BY R. L. Stinchfield
N. M. Perrins
ATTORNEY

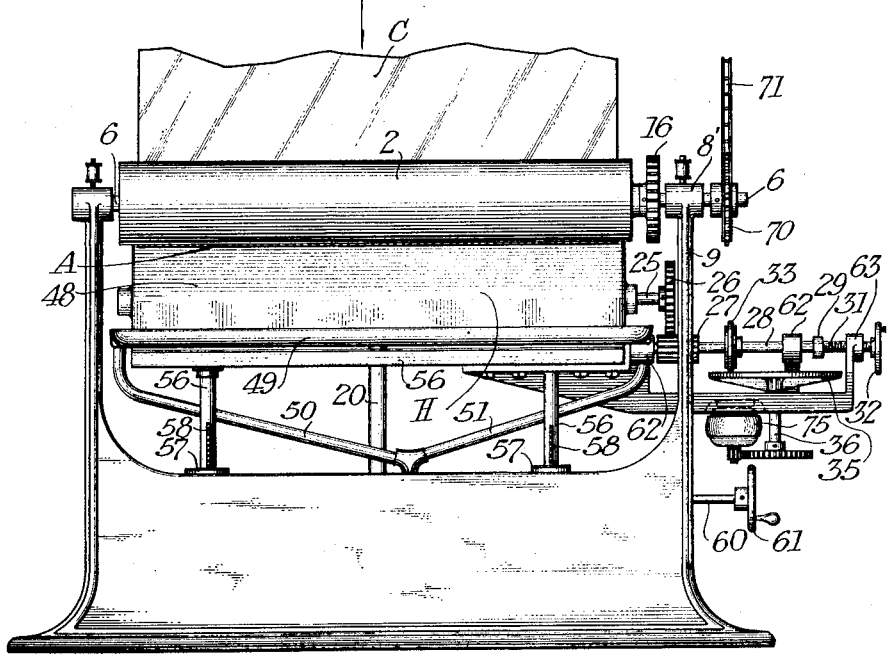

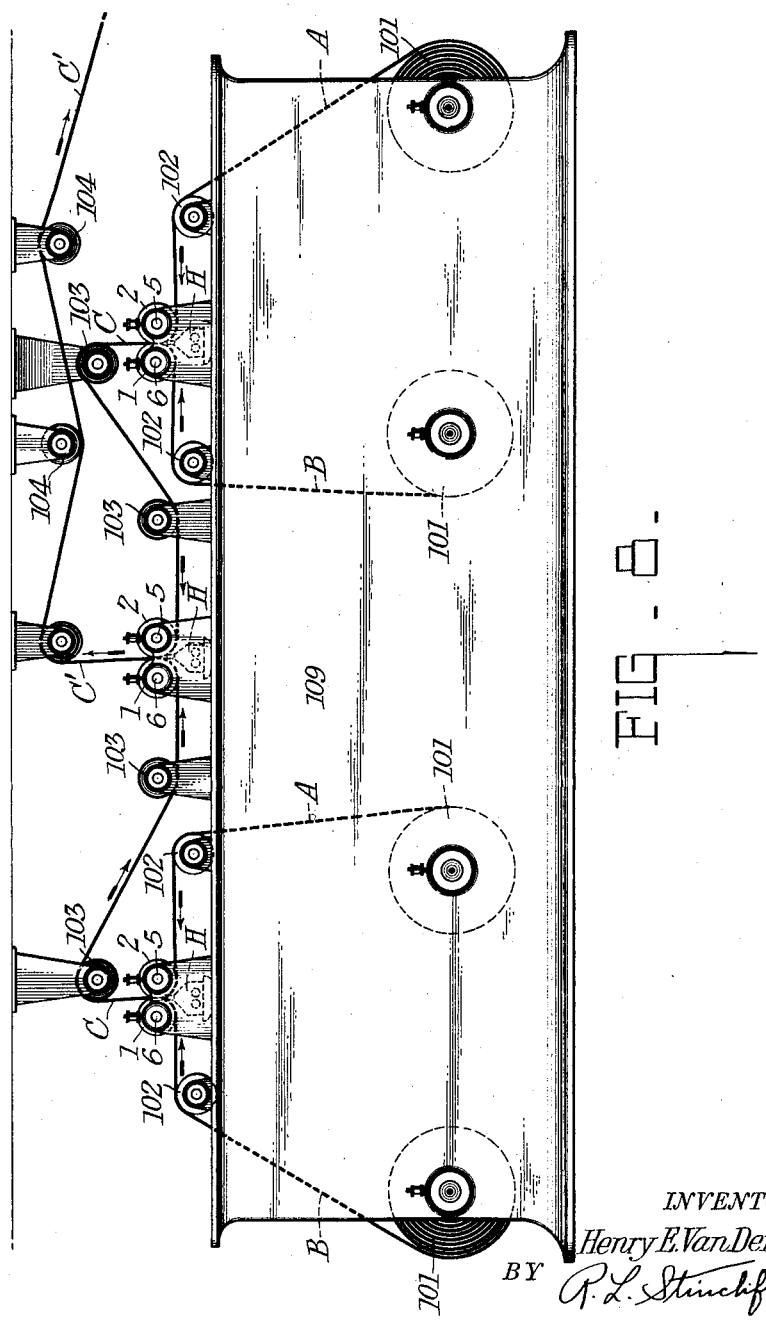

Patented Sept. 6, 1927.

UNITED STATES PATENT OFFICE.

HENRY E. VAN DERHOEF, OF ROCHESTER, NEW YORK, ASSIGNOR TO EASTMAN KODAK COMPANY, OF ROCHESTER, NEW YORK, A CORPORATION OF NEW YORK.

PROCESS AND APPARATUS FOR UNITING STRIPS OF MATERIAL.

Application filed November 9, 1923. Serial No. 673,841.

This invention relates to a process and an apparatus for building up a thick film of cellulosic material from a plurality of thin films. A thin film dries more quickly and uniformly than a thick film, and it is possible to make a large area of thin film, season this and cement several laminations together to form a thick film in less time than would be required to make and season a single thick film. The adherence inducing material which may be a solvent or any known cement is volatile and the amount used is small so that the cemented film does not require an appreciable drying time. The resulting product is usually indistinguishable from a layer formed as a single film.

It is desirable that the material, which is, of course, a solvent for the material of the film, usually pyroxylin, should act upon it for the shortest possible time and that as small a quantity as possible be used. If the material is applied in a pool between and above two rolls, down between which the film is drawn, the latter is exposed to its action for an unnecessarily long time. The surface of the film is attacked and the material becomes degraded with the resulting products. I have found that if the films are drawn upwardly between the rollers and the material applied just as they approach contact, a more uniform application is attained and satisfactory results are obtained. This process and the novel apparatus by which I carry it out are more full described in the following specification, reference being made therein to the accompanying drawings in which the same reference characters designate the same parts throughout and in which, Fig. 1 is a section through a portion of a machine constructed in accordance with and embodying one form of my machine;

Fig. 2 is a perspective view of the feeding hopper removed from the machine;

Fig. 3 is a fragmentary detail side elevation of the pump drive;

Fig. 4 is a part section part side elevation of the hopper carrier;

Fig. 5 is an end elevation of the roller rotating mechanism;

Fig. 6 is an elevation of the assembled apparatus;

Fig. 7 is a section of an alternative form of apparatus.

Fig. 8 is a side view of a machine for building up a film from more than two laminations.

As is shown in Fig. 1, the skins or thin films, A and B, pass over rollers 1 and 2, being fed from suitable guides and reels, not shown, and are pressed together at 3 where the solvent or cement 4 is applied to the skins, after which a laminated skin C passes upwardly from the rollers. In this instance, roller 1 is rubber, mounted on shaft 5, and roller 2 is of polished steel carried by shaft 6, so that there is a resilient pressure exerted between them. Shaft 6 is carried in suitable fixed bearings 8' in end frames 9, while shaft 5 is journaled in bearing 8 which is mounted to slide on rails 10 of frame 9, being adjustable to and from bearing 8' by the screw 11 and handle 12. A dial 13 and pointer 14 may be used to set the bearing in a definite location. A similar bearing at the other end of the shaft (not shown) may similarly be set so that rollers 1 and 2 will be parallel.

Rollers 1 and 2 move together through intermeshed gears 15 and 16 in which there is sufficient play to permit the necessary slight adjustment to and from each other, this being usually only a few thousandths of an inch. Gears 15 and 16 are affixed to shafts 5 and 6, shaft 6 being driven by gears 70 and chains 71 from a source of power (not shown). Obviously, skins A and B are moved at exactly the same speed.

In order to feed the material 4 as high up between the rollers as is possible a novel hopper H is used. The liquid 4 flows under slight pressure through pipe 20 into a small reservoir 21 and is then evenly fed by the pump 22, to the upper chamber 65, this pump comprising gear rods 23, 24 having longitudinal gear teeth extending their length and intermeshing.

These gear rods fit rather closely in the concave side walls 64 and 65. It is obvious that as they turn in the directions indicated by arrows in Fig. 1 a certain amount of cement will be carried up between the teeth, but that as the teeth intermesh in turning downwardly most of the material will remain in the upper chamber 41. The constantly rotating gears act as pumps maintaining the material in chamber 41 under pressure and extruding it from the orifice between the spaced lips 42. These gear rods are rotated at a definite speed determined by the mechanism shown in Fig. 3. The shaft 25 of gear rod 23 is driven by gear 26 meshing with gear 27. Gear 27 is affixed to a shaft 28 which is slidable in bearings 62 and one end 29 of which is engaged by a flange 30 carried by the screw 31 which engages the threaded support 63 and is adjusted by handwheel 32. A pulley 33 is also affixed to shaft 28 to turn therewith. Disk 35 is driven at a constant speed by shaft 36, which is driven from motor 75, and pulley 33 is frictionally driven thereby. By moving handwheel 32 the speed of the gear rods 23 and 24 is altered, thus feeding more or less material into the feeding tank 40.

Tank 40 carries a distributing chamber 41 through which the material 4 passes under a controlled pressure, rising between the blades 42. These blades, held by bars 43 and 44 are made from thin spring steel strips, having extremely smooth skin contacting edges 45. These edges may be compressed more or less by the surface of the skins A and B as they pass around the surface of rollers 1 and 2. The spring is sufficient to form a substantially liquid tight joint or dam. Any leakage, such as is sometimes unavoidable in starting or stopping the machines, passes down over the sloping side walls 48 of the hopper into the drain 49 which extends entirely around the tank, and from which the fluid material may flow through drain pipes 50 and 51 (Figs. 2 and 6). It will be seen that there is formed a body or pool of material between the lips 42 and the rolls or the strips passing around the rolls and the strips are drawn past this body or pool.

Casing 48 is supported by rails 52 and 53 engaging flanges 54 of the table top 55, this member being carried by shafts 56, each mounted in bearings 57 and having racks 58 engaged by gears 59 mounted to turn with shaft 60 movable through handwheel 61. This permits the removal of the hopper from its operative contact with the roll and also the adjustment of the pressure between the resilient lips 42.

The adjustment between the rolls 1 and 2 is adjusted so as to subject the films A and B to such pressure as will permit to pass only sufficient material to make a satisfactory joint. If desired the material may be colored to give the resultant film any desired permanent tint. The speed of the gear rolls 23 and 24 is also adjusted so as to feed just enough material to the upper reservoir to satisfy the requirements of the operation.

It is obvious that numerous modifications are possible and one such alternative embodiment is shown in Fig. 7. The films A and B are, as before, led around rollers 1 and 2 and pressed together to form film C.

The hopper H′ is constructed like hopper H except for the details to be mentioned. The sloping side walls 48′ terminate in upper flanges 43′ separated by slot 41′. Rubber strips 42′ are secured to the flanges by clamping bars 65. The pool of material 4 is maintained at such a height that it does not completely fill the space between the rolls but its upper surface is above the upper edges 45′ of the strips 42′ which latter contact with the films A and B. The films contact the body of material and draw a certain amount along. If too much adheres to the film surface it is pressed out by the rollers. The feeding of the material through the hopper is regulated so as to maintain the level of the pool constant.

When in the claims I refer to the lips as bearing against the rolls it is to be understood that the film of material may be in place between a roll and the corresponding lip.

In Fig. 8 is illustrated a multiple unit machine. This comprises a main frame 109 supporting three units each having pressure rolls 1 and 2, beneath which is a trough H the details of which have already been fully described. Within the frame are journalled suitable supply rolls 101 from which strips of film are led in pairs A and B to the two outer units over suitable idle rolls 102. The resultant films C are directed by other idle rolls 103 to the middle unit where they are united in the same way to form a four-ply strip C′ that is led away over suitable idle rolls 104 to any suitable storage receptacle or roll.

This furnishes a method and means for quickly making a thick film of uniform quality.

It is to be understood that the described apparatus is illustrative and that I consider as within the scope of my invention all such modifications and equivalents as fall within the terms of the appended claims.

Having thus described my invention, what I claim as new and desire to secure by Letters Patent is:

1. In the process of laminating a plurality of strips of cellulosic material to form a single homogeneous band, the steps of moving said strips upwardly along converging paths into contact and maintaining a stationary body of liquid material comprising a volatile solvent for the cellulosic material in contact with a surface of at least one strip as said surface moves upwardly along one of said paths towards contacting position and close to and immediately below the contacting position.

2. In the process of laminating a plurality of strips, the steps of moving said strips upwardly along converging paths into direct, intimate contact and maintaining a stationary, single body of liquid, volatile material, comprising a solvent for the material of the strips in contact with all of said strips below and adjacent their line of contact.

3. In the process of laminating strips, the steps of moving said strips upwardly along converging paths into contact, thereby forming a space between said strips which narrows upwardly with its apex at the line of contact thereof and maintaining a single, stationary, body of adherence-inducing material in contact with the moving facing surfaces of said strips within said space.

4. In the process of laminating strips, the steps of moving said strips upwardly along converging paths into contact, thereby forming a space between said strips which narrows upwardly with its apex at the line of contact thereof and maintaining a single stationary pool of adherence-inducing material in contact with the moving facing surfaces of said strips within said space just below and adjacent said apex.

5. The process of uniting two strips of cellulosic material to form a single homogenous band that comprises passing them from opposite directions upwardly between rounded pressure surfaces which force them into intimate contact and in applying a volatile liquid comprising a solvent for the cellulosic material to the facing surfaces of the upwardly moving strips just before these contact one another.

6. The process of uniting two strips of material that comprises passing them from opposite directions upwardly between pressure rolls which exert a controlled resilient pressure and force the strips into intimate contact and in applying a liquid adherence inducing material to the upwardly moving facing surfaces of the strips of material just prior to their contact with one another and feeding a supply of such liquid to the points of application under pressure just sufficient to supply the quantity required for adhesive action.

7. The process of uniting two strips of cellulosic material to form a single, homogeneous band that comprises passing them upwardly along arcuate paths, to a line of contact, applying to the upwardly moving facing surfaces just below the line of contact a volatile liquid comprising a solvent for the cellulosic material and acting to unite the strips, exerting upon the strips on their outer surfaces opposite their line of contact a controlled pressure sufficient to extrude from between them any surplus liquid and to force the strips into intimate contact and feeding a supply of such liquid to the points of application under pressure just sufficient to supply the quantity required to unite the strips.

8. Apparatus for laminating strips comprising means for moving and guiding said strips upwardly along converging paths and pressing the same into contact, thereby forming a space between said strips which narrows upwardly with its apex at the line of contact thereof, and means within said space for supporting a single pool of adherence-inducing material in contact with the facing surfaces of all said strips.

9. Apparatus for laminating strips comprising means for moving and guiding said strips upwardly along converging paths and pressing the same into contact, thereby forming a space between said strips which narrows upwardly with its apex at the line of contact thereof, and means for supporting a body of liquid within said space and adjacent its apex in a position where the facing surfaces of said strip will be drawn across it.

10. Apparatus for uniting two strips of material and comprising two horizontal, parallel rolls, means for turning said rolls to advance strip material upwardly between them, and means for supporting a pool of liquid between said rolls and beneath the line of pressure.

11. Apparatus for uniting two strips of cellulosic films, comprising two parallel, horizontal rolls, a hopper having an extension beneath said rolls and directed upwardly between the rolls and adapted to apply liquid from said hopper to strips of material as the latter are fed upwardly between the rolls.

12. Apparatus of the type described comprising pressure rolls adapted to rotate to pass strip material upwardly between them, resilient lips arranged longitudinally of said rolls and adapted to bear against such strip material as it passes around the rolls and forming dams for retaining in the space between the lips and rolls a supply of liquid and means for feeding such liquid to said space.

13. Apparatus of the type described comprising pressure rolls adapted to rotate to pass strip material upwardly between them, resilient lips arranged longitudinally of said rolls and adapted to bear against such strip material as it passes around the rolls and forming dams for retaining in the space between the lips and rolls a supply of liquid, means for feeding such liquid to said space, means for varying the pressure between the rolls and means for controlling the flow of liquid.

14. A hopper for feeding liquid upwardly between two closely arranged parallel rolls and comprising a reservoir for containing liquid under pressure and an upwardly directed extension from said reservoir having opposite side walls terminating in upwardly directed flexible lips adapted to bear resiliently against the rolls.

15. A hopper for feeding liquid upwardly under controlled pressure and comprising a chamber having a narrow orifice in its top through which the liquid may be extruded and having rounded concave side walls, and rolls having intermeshing teeth and fitting closely in said side walls and adapted to be turned so that the teeth will move downwardly at the points of intermeshing and upwardly where they pass the side walls, whereby they act to pump liquid from the portion of the chamber below the rolls to the portion above the rolls.

16. A hopper for feeding liquid upwardly under controlled pressure and comprising a chamber having a narrow orifice in its top through which the cement may be extruded and having rounded concave side walls, and rolls having intermeshing teeth and fitting closely in said side walls and adapted to be turned so that the teeth will move downwardly at the points of intermeshing and upwardly where they pass the side walls, whereby they act to pump liquid from the portion of the chamber below the rolls to the portion above the rolls, and means for varying the speed of rotation of the rolls whereby the pressure exerted on the cement may be controlled.

17. Apparatus for uniting two strips of film comprising two parallel, horizontal rolls and a hopper having an extension beneath said rolls and comprising two upwardly directed spaced resilient lips whereby when strips of material are passed upwardly between the rolls the lips may press resiliently against them.

18. Apparatus for uniting two strips of film comprising two parallel, horizontal rolls and a hopper having an extension beneath said rolls and comprising two upwardly directed spaced resilient lips whereby when strip material is passed upwardly between the rolls the lips may press resiliently against them, and means for feeding liquid under controlled pressure into said hopper and to the extension.

19. Apparatus for uniting two strips of film comprising two parallel, horizontal rolls, a hopper beneath the rolls comprising a chamber adapted to contain liquid and having an extension extending up between the rolls and terminating in spaced, parallel, flexible lips, adapted with the rolls to form a dam for liquid, and means to force liquid to the space between the lips.

20. Apparatus for uniting two strips of film comprising two parallel, horizontal rolls, a hopper beneath the rolls comprising a chamber adapted to contain liquid and having an extension extending up between the rolls and terminating in spaced, parallel, flexible lips, adapted with the rolls to form a dam for liquid, and means to force liquid to the space between the lips, the hopper with the extension being vertically adjustable.

21. The method of making a thick cellulosic film that comprises passing thin strips of films in pairs in an upward direction over pools of adherence inducing liquid material and at once upwardly between pressure rolls and then in the same manner uniting the strips of thicker film thus formed.

22. Apparatus of the class described comprising pairs of pressure rolls, liquid-applying means immediately below and between said pairs of rolls, means for directing thin strips of films upwardly over certain of said liquid-applying means and between the corresponding pressure rolls to form thicker strips, and means for directing a pair of said thicker films over a liquid-applying means and upwardly between the corresponding pressure rolls.

Signed at Rochester, New York, this 5th day of November, 1923.

HENRY E. VAN DERHOEF.